United States Patent [19]

Stibila

[11] Patent Number: 5,204,799
[45] Date of Patent: Apr. 20, 1993

[54] PROTECTIVE ARRANGEMENT FOR TELECOMMUNICATIONS LINE INTERFACE CIRCUIT

[75] Inventor: Michael E. Stibila, Lake Mary, Fla.

[73] Assignee: GPT Limited, Coventry, England

[21] Appl. No.: 497,274

[22] Filed: Mar. 22, 1990

[51] Int. Cl.⁵ ............................................. H01H 85/04
[52] U.S. Cl. .................................... 361/104; 361/119; 338/309; 338/204; 338/297
[58] Field of Search ................... 361/104, 106, 58, 91, 361/124, 119; 337/309, 297, 159, 308, 166, 232, 284

[56] References Cited

U.S. PATENT DOCUMENTS

| | | | |
|---|---|---|---|
| 2,973,418 | 2/1961 | Whitman . | |
| 3,836,884 | 9/1974 | Oliver | 337/163 |
| 3,978,443 | 8/1976 | Dennis et al. | 338/309 |
| 4,006,443 | 2/1977 | Kouchich et al. | 338/215 |
| 4,376,927 | 3/1983 | McGalliard | 337/297 |
| 4,414,526 | 11/1983 | Panaro | 337/163 |
| 4,476,350 | 10/1984 | Aull et al. . | |
| 4,494,104 | 1/1985 | Holmes | 337/403 |
| 4,626,818 | 12/1986 | Hilgers | 337/166 |
| 4,652,848 | 3/1987 | Hundrieser | 337/297 |
| 5,084,691 | 1/1992 | Lester et al. | 337/297 |

Primary Examiner—Todd E. DeBoer
Attorney, Agent, or Firm—Jacobson, Price, Holman & Stern

[57] ABSTRACT

A circuit protection device designed to protect a pair of electrical circuits by fracturing at such time as an overcurrent condition has occurred in a first of the circuits, this novel device comprising a substantially flat substrate of non-conductive, frangible material upon which a resistive component and a fuse conductor reside in an adjacent relationship on a common surface. The resistive component is part of a first circuit, and the fuse conductor is part of a second circuit. The resistive component, at the time of an overcurrent therethrough, becomes hot and causes a heating of the near surface of the frangible substrate. The frangible substrate, as a result of the uneven heating of its opposite surfaces, elongating and then fracturing, the fracturing of the frangible substrate thereby bringing about a fracturing of the resistive component as well as a fracturing of the fuse conductor, thus to effect an interruption of the first circuit as well as a substantially simultaneous interruption of the second circuit. This novel device is admirably suited for protecting a subscriber line interface circuit.

33 Claims, 4 Drawing Sheets

PROTECTIVE ARRANGEMENT FOR TELECOMMUNICATIONS LINE INTERFACE CIRCUIT

FIELD OF THE INVENTION

This invention relates to a means of protecting a telecommunications subscriber line interface circuit from high voltages, and also relates to a novel fuse device or circuit protection device for the protection of a wide range of circuits, including solid-state circuitry.

DESCRIPTION OF THE PRIOR ART

It is known to protect subscriber line interface circuits (SLIC) utilizing solid state components from any abnormally high voltages caused to exist on the tip and ring conductors of a subscriber line. These abnormally high voltages may come about because of lightning strikes and/or AC power cross, and it is typical to utilize carbon blocks coupled so as to conduct current to ground. In addition, a solid state voltage limiting device, utilizing for example Zener diodes, SCR crowbar, MOV or diodes, can be coupled between each conductor of the telephone line to ground. Furthermore, a small resistance can be inserted into each line, such as about 100 ohms, to limit the maximum surge current to a finite value. Since it is typical for the current limiting resistors to be inserted in series with the telephone line conductors, it is necessary that the resistances be equal to within a fraction of an ohm in order not to adversely affect the longitudinal balance of the telephone line interface.

Since resistances of a precision value are necessarily expensive, an expedient of utilizing negative feedback loops may be utilized between the subscriber line interface circuit and certain of the lines. The effect of the feedback loops is to equalize impedances so that gross mismatches between the values of resistances are compensated. However, the presence of the feedback loops creates another problem in that in the event of a surge caused for example by a lightning strike or AC power cross, the power flowing in the lines may exceed the power rating of the resistances, causing the resistances to fuse and form electrical open circuits.

However, in the fused condition, there may still be a physical link across the resistances, which may not have sufficient dielectric strength to isolate low impedance inputs of the subscriber line interface circuit (SLIC) from the surge voltage. In addition, connections of the feedback loops to the SLIC, which normally have a high impedance, are exposed in any case to the high surge voltage. The high voltage surge, experience has shown, will often damage high impedance connections, necessitating replacement or repair of the SLIC, which is an expensive operation.

One specific embodiment of telephone switching equipment to which a SLIC and protection network could be connected is disclosed in U.S. Pat. No. 4,479,034 to Brightman et al entitled "Arrangement of Interactive Processors for Control of Ports." The embodiment therein taught is a central office, or telephone exchange switch. Another such embodiment involves U.S. Pat. No. 4,621,351 to Haresh Jotwani. The Aull U.S. Pat. No. 4,476,350 entitled "Battery Feed Circuit" shows a typical state of the art SLIC embodiment using conventional feedback paths.

SUMMARY OF THE INVENTION

The novel circuit protection device in accordance with this invention may principally comprise a thick film resistor and a mechanically coupled fuse conductor, which opens when the resistor fails open. Thick film resistors typically fail due to the application of excessive power by breaking in half, that is, the substrate on which the thick film is printed cracks in half, resulting in both an electrical and physical (mechanical) open circuit. As will be seen hereinafter, the present invention takes advantage of the expected failure mode of the typical thick film resistor.

The cracking of the substrate is due to the unequal thermal expansion of the two surfaces of the substrate. In the primary embodiment of my invention, heat is generated only on one side of the frangible substrate, the side where the resistor is located, so the thermal expansion is greater on that side, when compared with the other. The temperature differential between the two surfaces of the substrate causes a mechanical stress that is focused at the middle of the substrate. When the brittle substrate cracks along the vertical centerline as a result of that stress, both the resistor and the adjacent fuse conductor provided in accordance with this invention are caused to open, not only mechanically but electrically as well.

Further basis for the novelty of this invention is associated with the fact that the input and output pins used in connection with my novel circuit protection device are soldered into a printed circuit board in a straight line. These input and output pins physically hold the substrate in line and act as a heat sink at or near the bottom of the substrate. This causes a temperature differential to be created between the top and the bottom of the resistor, focusing the mechanical stress near the top of the device, generally parallel to the substrate.

Hence, the total mechanical stress in the substrate is the direct result of two orthogonally related temperature differentials, primarily the surface to surface differential, and secondly the top to bottom differential, which results in the focussing of the mechanical stress at a location in the upper middle portion of the substrate.

The proper placement of the fuse conductor I provide on the substrate is critical to the success of the instant device. Thus, it is important for the fuse conductor to be disposed at the location that represents the focus of the mechanical stress, which is across the top of the single in line package. At this location of the focus of the orthogonally related mechanical stresses, the cracking or fracturing of the substrate begins at the time of a predetermined level of overcurrent through the resistor.

It is most important for the proper operation of my invention for the fuse conductor to be severed completely before the resistor opens, because it is the heat being generated in the resistor that is the source of the enabling mechanical stress. If the resistor should open before the novel fuse conductor is severed, the mechanical stress could be removed before the fuse conductor breaks, resulting in a device that is no more effective in protecting sensitive devices than the basic resistor acting alone would have been.

As earlier indicated, a key aspect of my novel device is the placement of the fuse conductor wire across the top of the device, where it is sure to be broken by the two orthogonally related cambering effects, due to the heating of the resistor. This conductor wire is placed in series with the feedback sense or high impedance input of an adjacent solid state SLIC. When the resistor substrate cracks in half as a result of overcurrent through the resistor, the fuse conductor is, fortuitously, also severed, due to the novel mechanical coupling present between the resistor and fuse conductor. Therefore, quite advantageously, both the low and high impedance inputs to the solid state SLIC are electrically and physically isolated from the high voltage potential, thus quite effectively protecting the expensive SLIC.

As will be discussed at length hereinafter, one substantial advantage of my novel device is that all the exposed inputs of the SLIC are isolated both electrically and physically from the foreign potential when the resistor fails. Because the resistor portion of my device fails before any damage occurs to the SLIC, it is to be seen that a relatively inexpensive part or component can be readily replaced by the user, thus restoring the Line Interface Circuit to an operational condition without necessitating that it be sent back to the manufacturer.

Novel aspects of my invention can be enumerated as follows:

1) Mechanical coupling of the resistor and fuse conductor.
2) Capitalizing on the failure mechanism of the thick film resistor.
3) Placement of the conductor along the top of the substrate to maximize the probability of it being severed at the appropriate time.
4) Both electrical and physical (mechanical) isolation of all the exposed inputs output of the SLIC.

It is to be realized that my novel circuit protection device could be constructed utilizing thin film resistor technology, although the thin film implementation would be slightly more expensive. Also, the fuse conductor could be connected in series with the telephone line conductors and disconnect the SLIC from the foreign potential in that manner. The conductor would then have to be made with relatively expensive materials or solder dipped in order to minimize the magnitude of its resistance, so longitudinal balance would not be adversely affected.

Heat induced mechanical stress is the primary failure mode or mechanism of my novel device. The resistor substrate can be made smaller and handle the same power if the resistor is printed on both sides of the substrate, but in this instance the ohmage values of the two resistors must be different. By utilizing a resistor on each side of the substrate, the temperature differential between the two surfaces of the substrate is reduced, hence, the thermal expansion of the substrate surfaces is equal and less "bending" (mechanical stress) occurs. Since the cracking is a desired effect and a small, inexpensive resistor is also desired, it is feasible within the spirit of my invention to utilize unequal resistors, one on each side, resulting in a smaller resistor with a designed thermal differential (mechanical stress) which predictably fails by cracking or fracturing into two or more pieces.

I am not to be limited to the use of a single fuse conductor, for in various multi-circuit applications of my invention it may be highly desirable to use a plurality of electrically separate fuse conductors.

It is therefore a primary object of this invention to protect high impedance inputs from an overvoltage condition by the use of a small and inexpensive yet highly effective circuit protection device functioning as a result of heat induced mechanical stress.

It is another important object of my invention to provide a highly dependable circuit protection device utilizing orthogonally related cambering effects at the time of an overload for disconnecting and isolating high impedance circuit inputs.

It is still another object of my invention to provide a small, low cost device serving in the instance of heat induced stress to dependably prevent overvoltage damage to the components of a high impedance circuit, such as a semiconductor, resistor, capacitor, or the like.

These and other objects, features and advantages will be more apparent as the description proceeds.

DETAILED DESCRIPTION

Figure 1:
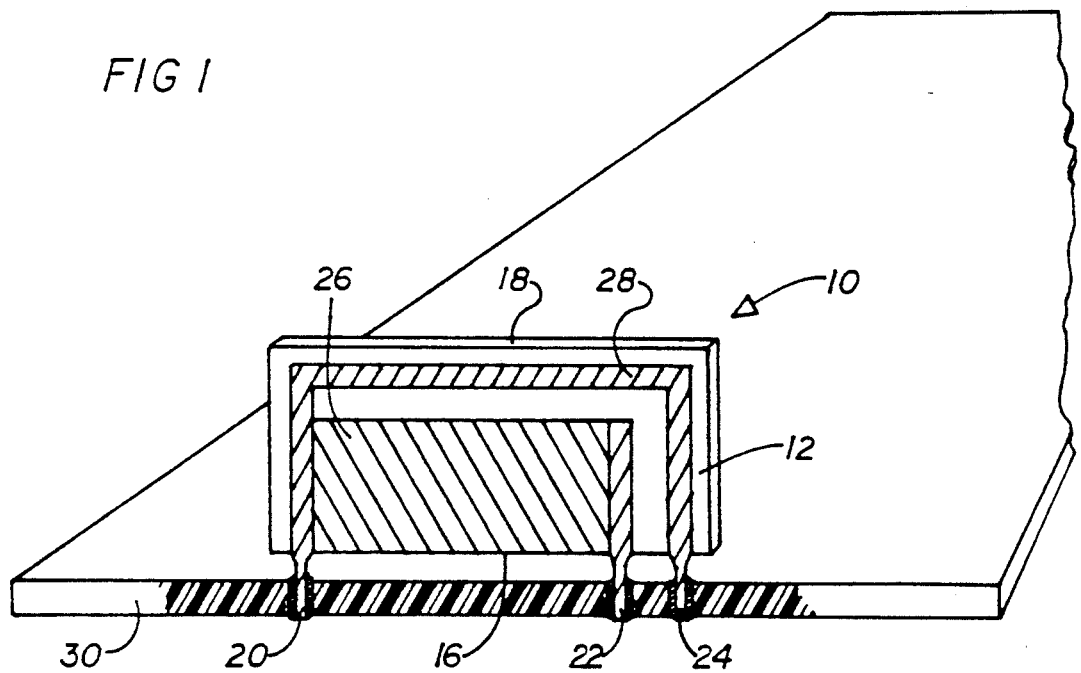
In FIG. 1, I have shown in simplified form, a preferred embodiment of my novel circuit protection invention, with certain portions removed in the interests of clarity.

With initial reference to FIG. 1, it will there be seen that I have there depicted a primary embodiment of my novel circuit protection device 10 designed to protect, by fracturing in a novel way, more than a single electrical circuit. The device 10 utilizes a substrate 12, which is a substantially flat member of non-conductive, frangible material, such as alumina substrate. The substrate 12 is of generally rectangular configuration, and it is to be realized that the substrate is relatively thin, being for exam 0.040 inches thick, with opposed parallel flat surfaces. The preferred substrate material has the nominal characteristic of more than 90% alumina and has a thermal capacity of approximately $$\frac{.9 \text{ Kilojoules}}{\text{kilogram C.}^\circ}$$

Quite obviously I am to be limited to neither this material nor to this particular thickness.

When the substrate is, for example, considered in a vertical attitude as shown in FIG. 1, these flat surfaces may be regarded as terminating in first and second relatively straight, generally parallel opposed edges 16 and 18.

As will later be developed at some length, one critical aspect of my circuit protection device is that the lower edge 16 of the frangible substrate be fixed with respect to a circuit board 30 or the like upon which it is mounted, so as to assure proper operation of my device in the event of an overload condition.

In FIG. 1 it will be noted that the substrate 12 is supported adjacent an associated electrical circuit, such as on an adjacent printed circuit board 30, by means of a plurality of connection pins 20, 22 and 24. Importantly, these pins are disposed in a straight array along the first or lower edge 16 of the substrate, so as to enter holes in the circuit board 30 that are precisely placed along a straight line. The lower edge 16 may be spaced 0.030 inches to 0.040 inches off the circuit board to prevent scorching of the circuit board should an overcurrent condition through the resistive component on the substrate be encountered.

FIG. 1 reveals that the second, opposite edge 18 of the relatively fragile substrate remains free, and in the illustrated instance, this free edge is at the top of the substrate 12.

It is to be noted from FIG. 1 that a resistive element 26 is tightly affixed on one flat surface of the frangible substrate 12, applied such as by a standard thick film (or thin film) resistor process. By way of example, the resistance material can be screened onto the substrate at room temperature, and the substrate later baked to cause the resistance material to harden properly. As will be understood, the application of resistive material to the frangible substrate entails several distinct stages, involving for example the steps of cleaning, screening, drying, then baking the substrate. The resistive material may for example be made up of a carbon-metal mix.

The resistive element 26 extends widthwise across a substantial portion of the one flat surface of the substrate, and is disposed generally parallel to the first edge 16, along which the connection pins are located. It is to be understood that the resistive element 26 is electrically connected by the connection pins 20 and 22 to a first portion of the associated electrical circuit.

In accordance with this invention, a fuse conductor 28 is also tightly affixed on the one flat surface of the substrate 12, at a location spaced just above the resistor 26 as viewed in FIG. 1. The fuse conductor may for example be a strip of palladium silver, an aluminum strip, or the like. I may choose to refer to the fuse conductor 28 in some instances as a "fuse strip," a "fusible conductor," or a "conductor wire." The fuse conductor 28 is located generally adjacent the resistive element 26, but disposed near the second or upper edge 18 of the substrate 12. It is to be noted that the fuse conductor 28 is electrically connected to a second portion of the associated electrical circuit 44 by means of two of the previously mentioned connection pins, these being pins 20 and 24.

It is to be noted that my invention may be created by either thick film or thin film techniques, with thick film of course being less expensive, and thin film representing higher performing technology. In either event, the result is the same when the substrate cracks and fractures, namely, both the resistive component and the fuse conductor break, thus preventing damage to the associated circuits. It is typical to utilize either thin film techniques or thick film techniques, but not to use these techniques in an intermixed relationship.

In some instances it may be possible to create the fuse conductor and the resistive element at the same time. This is possible if, for example, their ohmage values are in the same range, such as the fuse conductor having eight ohms resistance, and the resistive element being a twenty ohm resistor. Creating these components at the same time becomes less likely when the ohmage values are quite different, such as when an eight ohm fuse conductor is utilized with a one hundred oh m resistance element.

In order to exclude moisture, and provide long term stability as to the resistance value, it may in some instances be desirable to encapsulate the substrate and the components contained thereon, such as by a glass overglaze or a suitable plastic. Such a step as this forms no part of my invention, however.

Figure 2A:
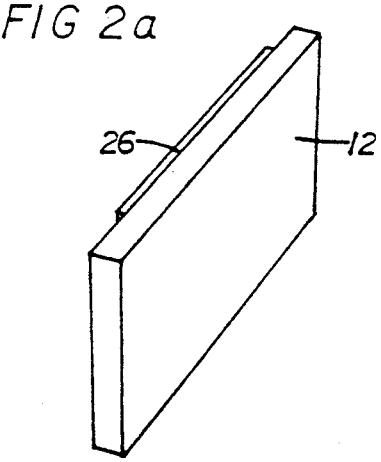
FIG. 2a is a simplified perspective view of a protection device in accordance with this invention, revealing that the frangible substrate is normally flat, and is considerably thicker than the resistive element secured thereto.
Figure 2B:
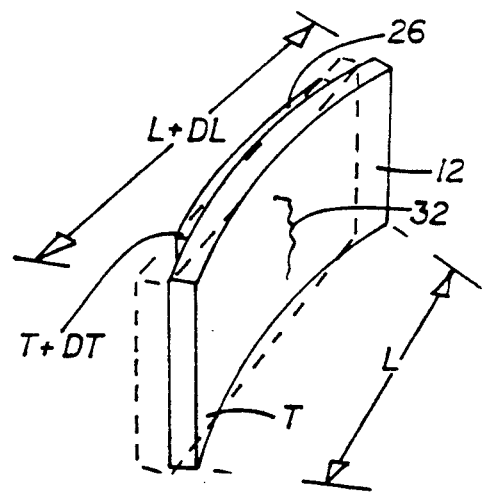
FIG. 2b is similar to FIG. 2a, but revealing the tendency of the substrate to bend on the occasion of the resistive element carrying an overcurrent, and then crack along a substantially vertical centerline.

With reference to FIG. 2a, it will be noted from this somewhat idealized, no-scale showing, that this figure depicts the resistor 26 and the substrate 12 in their normal or unstressed condition. When the resistor is carrying a normal amount of current, it remains flat, but when carrying an overcurrent, the resistor tends to heat and elongate. FIG. 2b is a figure drawn specifically with the goal in mind of depicting the primary mechanical stress that becomes involved in the practice of this invention at the time of an overcurrent through the resistor.

The dimension L shown on the side of substrate 12 opposite the resistor 26 in FIG. 2b represents the basic or original length of the substrate, whereas the dimension L+DL depicts the length of the substrate as a result of the thermal expansion of the near surface of the substrate due to the overcurrent through the resistor 26.

Similarly, the T near the bottom of substrate 12 in FIG. 2b represents the reference temperature, whereas T+DT near the top of the substrate represents the increase in temperature of the surface of the substrate due to overcurrent through the resistor.

It is to be realized that when a substantial amount of current passes through the resistor material 26, it is caused to become heated and expand, and to cause the near surface of the substrate to expand more than the backside, for there is a tangible time delay involved in heat transfer through the frangible substrate. In other words, I utilize substrate material which has relatively poor thermal conductivity.

As a result of the technique I use, the resistor material and the substrate tend to undertake the curved configuration depicted in FIG. 2b at the time of an overcurrent through the resistor. The substrate material to some extent resists this expansion and bending of the resistor material, but inasmuch as the substrate is rather fragile and entirely unable to withstand a considerable amount of bending, the unequal heating of the two faces of the substrate causes a vertical crack 32 to form in the substrate material, that is, to form in a direction perpendicular to the circuit board 30. This crack is thus formed as a result of the primary mechanical stress involved in my invention.

Certain embodiments of my invention are designed to fail at the time of an overcurrent, as a result of this primary failure mode. These embodiments of my invention could be effectively used when alternative means of mechanical interconnection are used to secure the substrate to the circuit board, and the substrate is not installed in an essentially perpendicular relationship to the circuit board by the use of pins arrayed in a straight line.

Figure 2C:
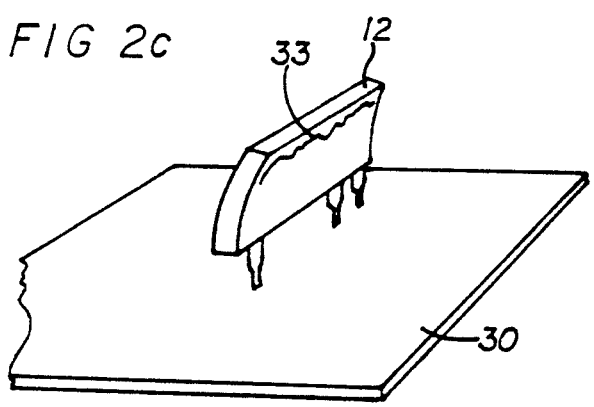
FIG. 2c is a view similar to the two immediately preceding figures, but showing the substrate supported by three pins inserted along a straight line in a circuit board, with this view illustrating the tendency of the top of the substrate to bend during a time of overcurrent through the resistive element.

Other embodiments of my invention may involve more than the aforementioned primary mechanical stress, for as depicted in FIG. 2c, a secondary mechanical stress, orthogonal to the primary stress, is brought about in the substrate material as a result of the restraint brought about by the anchoring of the pins 20, 22 and 24 in the holes disposed along a straight line in the circuit board material 30.

It is important to note that at the time of an overcurrent flowing through the resistor 26, the resistor heats and tends to expand. The heating of the resistor causes a substantial heating of the near substrate surface, and to a much less extent, a heating of the back surface of the substrate. Because the first or lower edge 16 of the substrate is restrained by the aligned connection pins 20, 22 and 24 in a fixed position, this edge remains comparatively straight, for the pins also serve as a heat sink. The second or upper edge 18 however, being unrestrained, tends to take on a substantial curvature parallel to the circuit board; note FIG. 2c, wherein horizontal crack 33 appears.

Figure 2D:
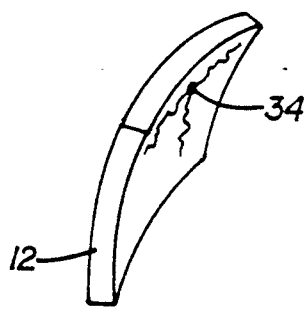
FIG. 2d is a simplified view representing the combined effect of bending of the type shown in FIG. 2b, with the bending of the type shown in FIG. 2c, with the resultant cracking effort being concentrated in the upper central portion of the substrate.

The combination of the primary and secondary mechanical stresses results in a concentration of stress in the upper central portion of the frangible substrate; note location 34 in FIG. 2d. Most importantly, this fracturing of the substrate as a result of the overcurrent through the resistor 26 causes a breaking of the fuse conductor 28, thus advantageously breaking or opening the electrical circuit of the fuse conductor, irrespective of the absence of an overcurrent flowing through the fuse conductor.

As should now be apparent, in the operation of my novel component 10, advantage is taken of the typical failure mode or failure mechanism of a thick film resistor. Thick film resistors fail due to excessive power by breaking in two, that is, the substrate on which they are printed cracks in half, resulting in both an electrical and a physical (mechanical) open circuit. The cracking is of course due to the unequal thermal expansion of the two surfaces of the frangible substrate. Since in this embodiment heat is only being generated on the surface of the substrate 12 on which the resistance 26 is disposed, the thermal expansion is greater on one substrate surface than the other. The temperature differential between the two surfaces of the substrate causes a mechanical stress focused at the middle of the substrate, as previously mentioned, leading to a fracturing of the substrate and the electrical components thereon.

Also as previously mentioned, the terminal pins 20, 22 and 24 are soldered into the printed circuit board 30 in a straight line. These input/output pins physically hold the bottom edge 16 of the substrate 12 in a straight line just above the circuit board, and act as a heat sink on the bottom of the substrate. For example, the spacing can be 0.030 inches to 0.040 inches from the circuit board. This causes a temperature differential to exist between the top and the bottom of the component, focusing the mechanical stress quite near the top of the device, as indicated in FIG. 2c.

As previously explained, in embodiments in which the pins are anchored along a straight line in the circuit board, there is a combined stress as the result of two temperature differentials, primarily the surface to surface differential, and secondly the top to bottom differential. The resultant of these stresses causes a focusing of the mechanical stress at the top middle portion of the substrate, as indicated at 34 in FIG. 2d.

The proper placement of the fuse conductor strip 28 on the substrate is critical to the success of my device. The fuse conductor is placed across the top of the substrate because in the embodiment depicted in the first several figures of drawing, this location is the focus of the heat induced mechanical stress. It is at the focus of the mechanical stress where the cracking or fracturing of the substrate begins.

It is most important to note that the fuse conductor 28 must be severed completely before the resistor 26 opens due to the cracking of the substrate 12, because it is the heat generated in the resistor that is the basic source of the above-described mechanical stress. As should be apparent, if the resistor 26 should open before the fuse conductor 28 is severed as a result of the stress fractures in substrate 12, the mechanical stress could be removed before the conductor 28 is severed, and that would of course result in a device no more effective than a resistor acting alone. It may therefore be seen that my above-described novel arrangement is somewhat analogous to the opening of a current limiting resistor.

It is thus to be realized that a key feature of this invention is the addition of the conductor wire or fuse conductor 28 across the top of my novel device, which conductor wire is to be placed in series with the feedback sense or high impedance input of the solid state SLIC for which my invention was designed. As will be obvious, however, my invention has a wide range of applications.

As should now be clearly understood, when the substrate cracks in two, the conductor wire 28 fractures substantially simultaneously with the fracturing of the resistor, due to the mechanical coupling present between the resistor and the conductor. Most advantageously, therefore, both the high impedance and low impedance inputs to the solid state SLIC are electrically and physically isolated from the high voltage potential, therefore completely protecting the expensive SLIC.

Figure 3:
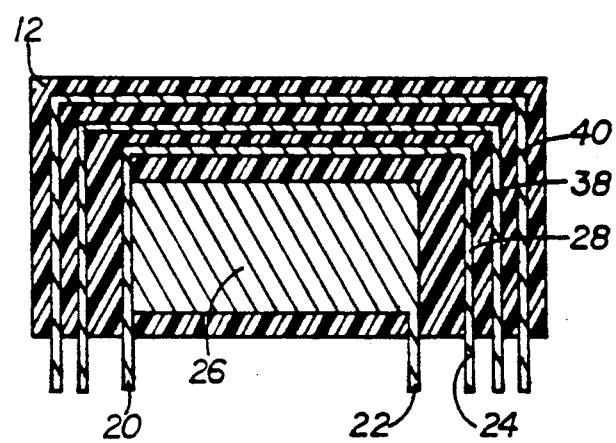
FIG. 3 is a representation of an embodiment in which a plurality of electrically separate fuse conductors are utilized on the same side of the substrate as the resistive element.

I am not to be limited to a device utilizing only a single fuse conductor, for as illustrated in FIG. 3, a device in accordance with this invention may involve a frangible substrate having thereon a plurality of electrically separate fuse conductors. In the embodiment revealed in FIG. 3, I have shown that three fuse conductors, conductors 28, 38 and 40, may be utilized across the top of the substrate. It is to be realized that FIG. 3 has not been drawn to scale, but it is nevertheless to be understood that these three fuse conductors are placed in locations on the substrate where the cracking is most likely to be concentrated.

In the typical instance in which multiple fuse conductors are utilized, one of such fuse conductors, such as fuse conductor 28, can continue to share a pin in common with the resistor designed to bring about the cracking of the substrate when an undesirable high overcurrent condition has occurred in the low impedance circuit.

Also, I am not to be limited, when more than one fuse conductor is utilized, to embodiments in which all of the fuse conductors are on one side of the substrate, for quite obviously at least one fuse conductor can be effectively utilized on each side of the substrate, as long as such fuse conductors are disposed in a location corresponding to position 34 revealed in FIG. 2d, where cracking is concentrated.

Figure 4:
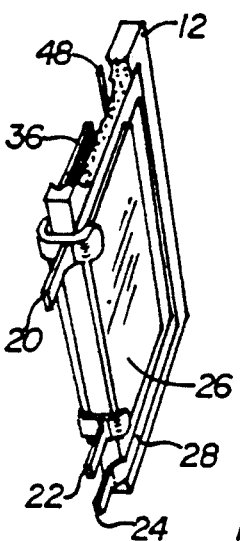
FIG. 4 is a perspective view of a double-sided embodiment of my invention, with paralleled resistive elements of different ohmage values being utilized on the two opposite faces of the substrate.

In FIG. 4 I reveal an embodiment in which a resistive element is utilized on both sides of the frangible substrate, with such elements being in an electrically parallel relationship. In this embodiment, resistive element 36 is disposed in a location essentially opposite the resistive element 26.

A double-sided embodiment can be physically smaller yet handle the same overload condition as the single-sided counterpart. This smaller size is possible because the primary mechanical stress due to surface-to-surface temperature differences has been reduced by heating both surfaces of the substrate simultaneously.

As should be obvious, entirely eliminating the primary mechanical stress would be highly undesirable inasmuch as the intended result is for the mechanical stress to fracture the brittle substrate when the electrical overload exceeds a predetermined level, this being accomplished in such a manner that the fuse conductor can dependably be broken. Such a predetermined level of excessive current can be set by calculating the appropriate difference in resistance values from one surface of the substrate to the other, as will bring about sufficient heating of the substrate as to result in the cracking of same at the time of electrical overload.

Typically the resistors utilized in the double-sided embodiment are disposed in an electrically parallel relationship, such as depicted in FIG. 4. However, I am not to be limited to this, for resistors in a series relationship could also be used in a double-sided component.

With the double-sided embodiment, I can use either one or multiple fuse conductors because it is within the scope of my invention to break one or more high impedance circuits when excessive current flows in the low impedance circuit of which the parallel resistors are a part. As depicted in FIG. 4, a fuse conductor 48 could be utilized relatively close to the resistive element 36, with the fuse conductor 48 being in approximately the same corresponding location on the one side of the substrate, as the location in which the fuse conductor 28 is utilized on the other side of the substrate 12.

Figure 5:
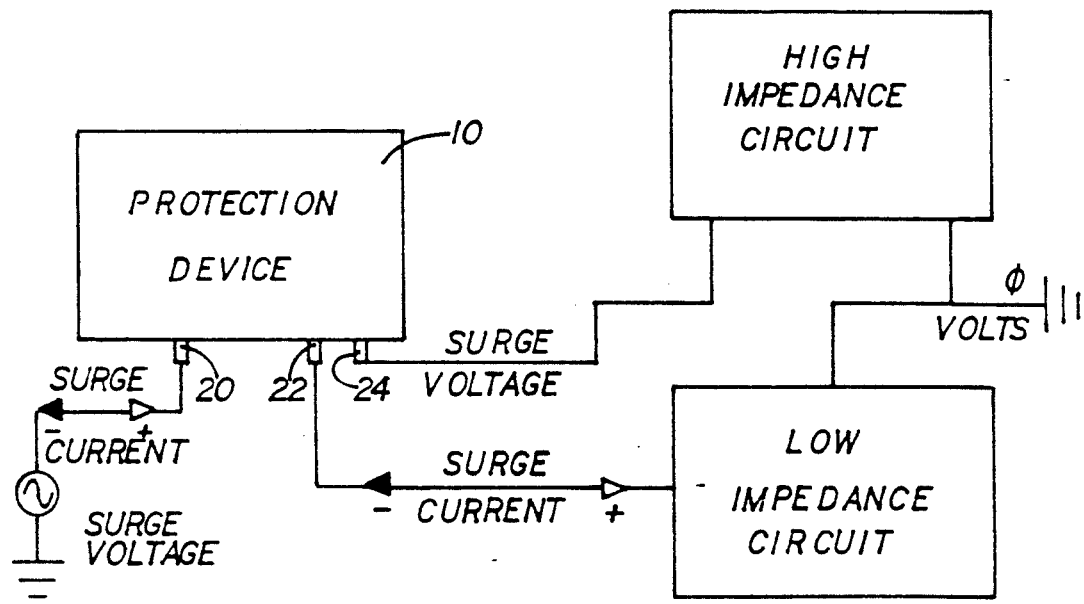
FIG. 5 is a block diagram revealing the typical instance in which a pin associated with the resistive element of my circuit protection device is connected to a low impedance circuit, whereas a pin associated with the fuse conductor is connected to a high impedance circuit.

FIG. 5 is a block diagram showing a typical utilization of my novel circuit protection device 10 with components to be found in a typical usage. As will be noted, the pin 22, attached to the resistive element, is connected to the low impedance circuit, whereas the pin 24, connected to the fuse conductor, is connected to the high impedance circuit. As by now should be obvious, insufficient current flows through the high impedance and the fuse conductor as would cause the substrate to fracture. It is therefore for that reason that I design the substrate so as to mount the fuse conductor in the most likely location to fracture as a result of too much current flowing through the resistive element 26 and the low impedance circuit. Because of such positioning of the fuse conductor, its fracturing is likely to occur at the time of such overcurrent through the resistive element 26.

Figure 6:
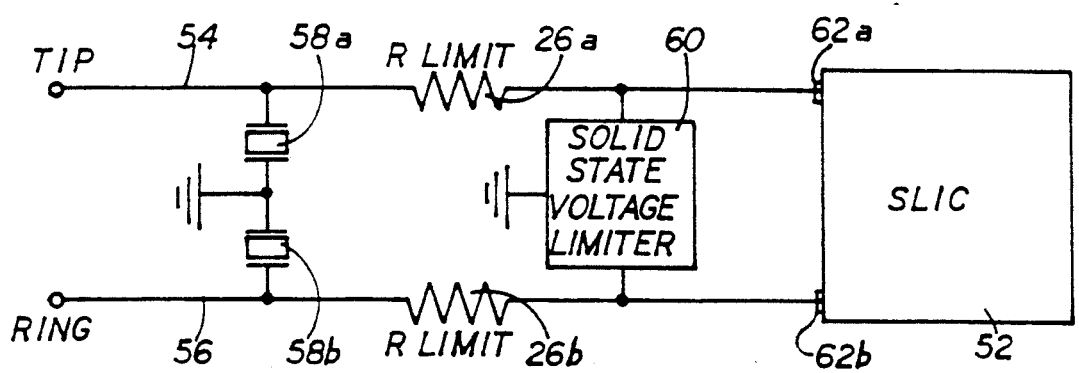
FIG. 6 is a schematic revealing how in accordance with the prior art, it is known to utilize certain resistive components, that are designed to protect a solid state subscriber line interface circuit from damage due to an overcurrent.

Turning now to FIG. 6, I there show a known arrangement for protecting a subscriber line interface circuit 52 comprising solid state components from abnormally high voltages existing on the tip conductor 54 and the ring conductor 56 of a subscriber line. In the event of high voltages existing on the subscriber line caused, for example, by lightning strikes and/or AC power cross, the carbon blocks 58a and 58b coupled between lines 54 and 56 and ground will act to conduct current to ground. In addition, a solid state voltage limiting device 60 (e.g. Zener diodes, SCR crowbar, MOV or diodes) is coupled between ground and each conductor.

In addition, a small resistance 26a is inserted into line 54, and a small resistance 26b is inserted into line 56. Each of those resistors typically have a resistance value of approximately 100 ohms, to limit the maximum surge current to a finite value. Since the resistances 26a and 26b are inserted into lines 54 and 56, it is necessary that the resistances be equal to within a fraction of an ohm in order not to adversely affect the balance of the telephone line interface.

Figure 7:
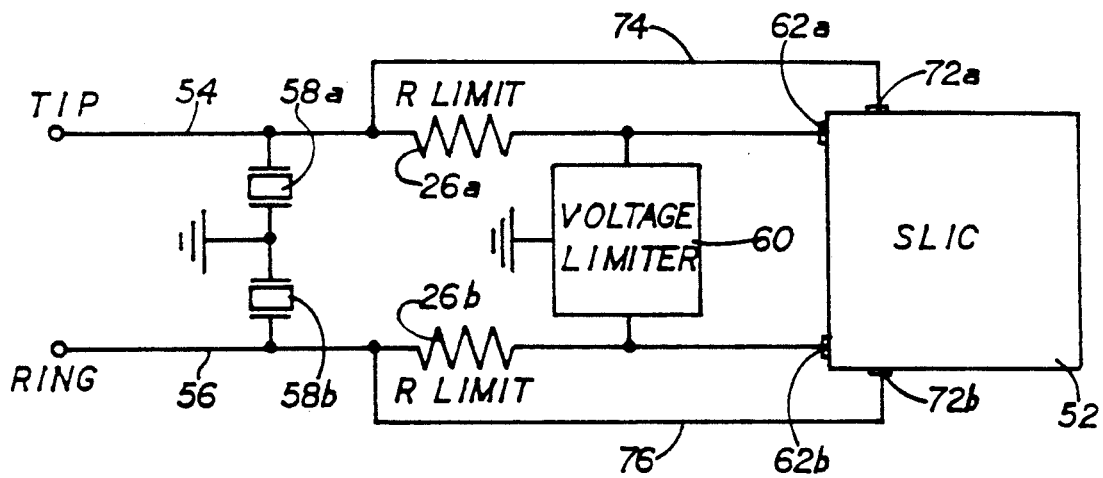
FIG. 7 is a schematic closely resembling FIG. 6, but revealing the addition of a pair of feedback loops serving to equalize line impedances, thus to compensate for mismatches between resistance values.

Since resistances of a precision value are necessarily expensive, the expedient depicted in FIG. 7 can be adopted, wherein negative feedback loops 74 and 76 are provided between the subscriber line interface circuit 52 and lines 54 and 56. In FIG. 7, identical parts to those of FIG. 6 are indicated by identical reference numerals. The effect of the feedback loops 74 and 76 is to equalize the impedances in the lines 54 and 56 so that gross mismatches between the values of resistances 26a and 26b are compensated.

Figure 8:
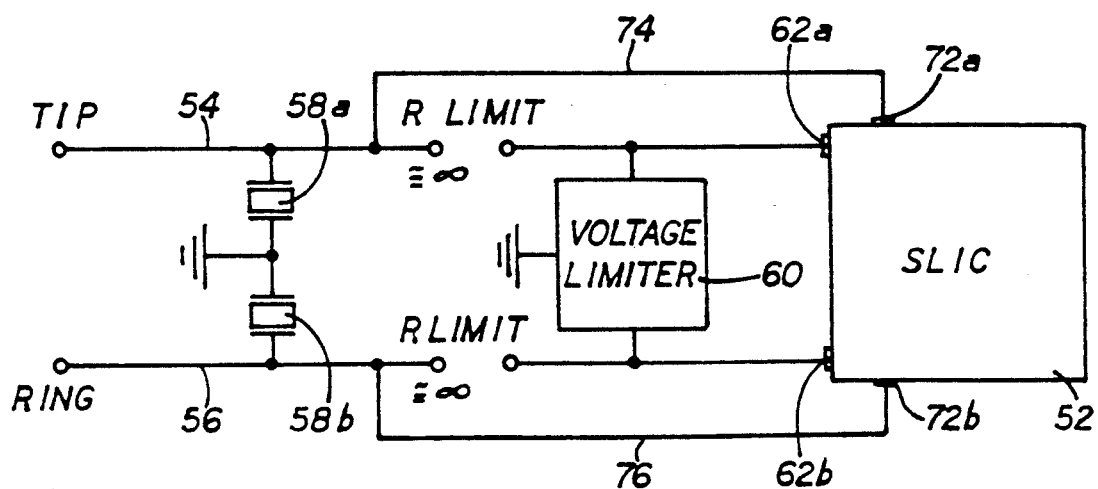
FIG. 8 is a view revealing the consequence of the failure of the current limiting resistors, and the undesirable effect of the equalizing circuits remaining.

It is to be noted, however, that the presence of the feedback loops 74 and 76 creates another problem in that in the event of a surge, such as for example caused by a lightening strike or AC power cross, the power flowing in the lines 54 and 56 may exceed the power rating of the resistances 26a and 26b, causing the resistances to fuse and form electrical open circuits. In the fused condition, however, there may still be a physical link across the resistances, which may not have sufficient dielectric strength to isolate inputs 62a and 62b of SLIC 52 from the surge voltage. The inputs 62a and 62b are normally of a low impedance. In addition, connections 72a and 72b of feedback loops 74 and 76 to SLIC 52, which normally have a high impedance, are in any case exposed to the high surge voltage. This situation is indicated schematically in FIG. 8, where open circuits are created by the failure of resistors 26a and 26b. The high voltage surge, experience has shown, will often damage high impedance connections 72a and 72b, whereupon replacement or repair of SLIC 52 is necessary, which is an expensive operation.

Figure 9:
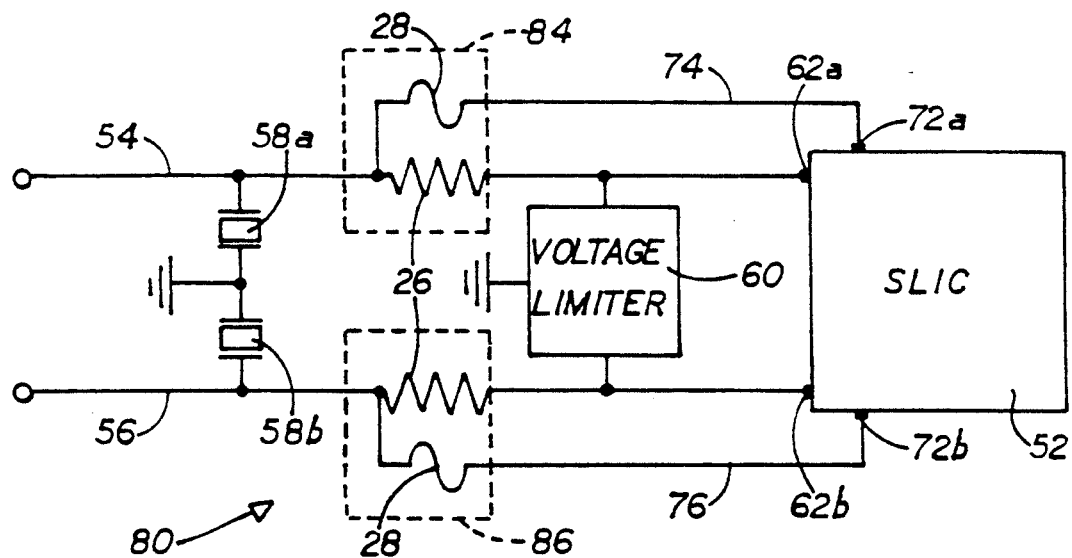
FIG. 9 is a schematic illustrating the use of a pair of my novel devices in conjunction with the previously described circuitry, with the resistive element in each instance being connected in the low impedance circuits, and the fuse conductor in each instance being utilized in the high impedance circuit.

Referring now to FIG. 9, a preferred form of my invention is seen to comprise a circuit organization 80 formed of a line interface circuit (SLIC) 52 and adjunct circuit elements 84 and 86 provided for the protection of the SLIC against damage by electrical surge or overload condition from the subscriber line. One rectangle formed of dashed lines is seen in FIG. 9 to define circuit element 84, whereas the other rectangle formed of dashed lines in FIG. 9 is seen to define the circuit element 86. Each of these novel circuit elements contains a resistor 26 and a fuse conductor 28. Circuit 80 is of the same type as earlier described, containing high-gain amplifiers which form part of negative feedback loops back around to the subscriber line side of the limiting resistors. The pair of carbon blocks 58a and 58b and the voltage limiter 60 have the same functions as heretofore described in connection with earlier figures.

In accordance with the present invention, the first fuse and resistance unit electrical component assembly 84 is electrically connected in a circuit organization with its input side directly coupled to high impedance feedback lead 72a of SLIC circuit 52, and the lead from the limiting resistance at its output side being directly coupled to low impedance input lead 62a of circuit 52. The second fuse and resistance unit 86 is similarly connected between ring conductor 56 and high impedance negative feedback lead 72b and low impedance input lead 62b.

Figure 10:
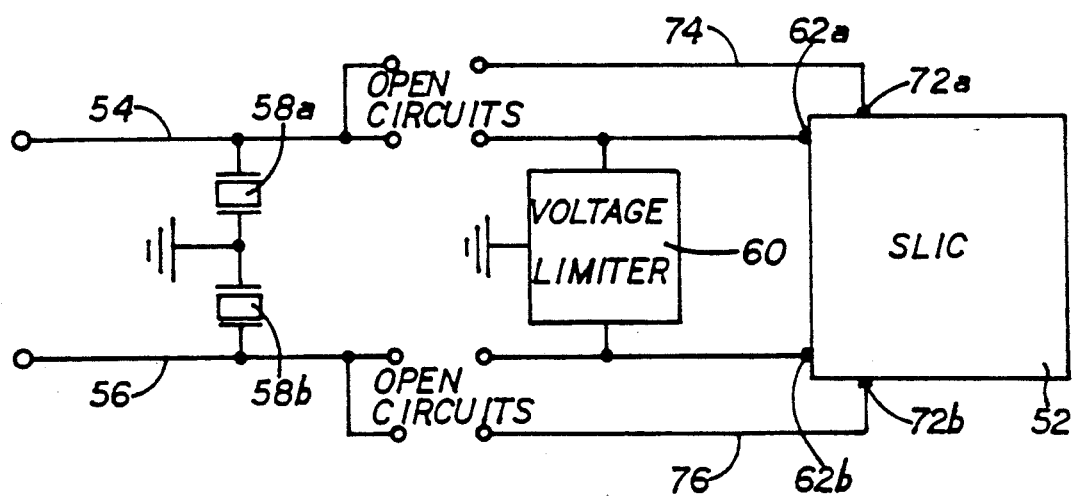
FIG. 10 is a view revealing how, as a result of the functioning of my novel devices, both sets of circuits are broken at the time of an overcurrent through the resistive elements, and not just the low impedance circuits, with this arrangement serving to completely protect the adjacent subscriber line interface circuit.

FIG. 10 reveals how, due to an overcurrent through the resistors 26 of circuit elements 84 and 86 of FIG. 9, these novel circuit elements have functioned in accordance with this invention to protect the expensive SLIC against excessive voltage and current. It is likely that both of the novel fuse and resistor units will, upon the occurrence of hazardous voltages, function at approximately the same time to protect the SLIC, but simultaneous functioning is not a requirement of this invention.

As should now be clear, one embodiment of my invention can involve configurations in which the primary stress depicted in FIG. 2b to represent the unequal thermal expansion of the two surfaces of the substrate is utilized for causing a fracturing of the substrate as well as the fuse conductor. An example is the use of substrates created in accordance with this invention, that are to be operatively disposed in an essentially parallel relationship to the circuit board, as opposed to the essentially perpendicular relationship depicted in drawing FIG. 1.

Other embodiments of my invention make use of the combined stresses discussed in conjunction with FIG. 2d, where the focus of stress on substrate 12 is the result of two orthogonally related cambering effects due to heating of resistor strip 26. In accordance with this embodiment of the present invention, this focus of stress is directed toward the fuse conductor portion of the device. The cracking or fracturing of the substrate 12 will begin near the focal point 34, ensuring that the closely adjacent fuse conductor is severed completely before resistance film strip 26 is severed.

As is obvious, when my device is used to protect a SLIC, all of the exposed inputs of the SLIC are isolated both electrically and physically from a hazardous potential when the resistance element fails.

As is also obvious, the thermal, dynamic and mechanical characteristics of materials used, and values and electrical characteristics of other associated circuit components are so chosen that fuse and resistor unit will fail before any damage occurs to the subscriber line interface circuit.

I claim:

1. A circuit protection device designed to protect a pair of electrical circuits by fracturing at such time as an overcurrent condition has occurred in a first of said circuits, said device comprising a substantially flat substrate of non-conductive, frangible material upon which a resistive component and a fuse conductor reside in an adjacent relationship on a common surface, said resistive component being part of a first circuit, and said fuse conductor being part of a second circuit, said resistive component, at the time of an overcurrent therethrough, becoming hot and causing a heating of the near surface of said frangible substrate, said frangible substrate, as a result of such heating, elongating and then fracturing, the fracturing of said frangible substrate thereby bringing about a fracturing of said resistive component as well as a fracturing of said fuse conductor, thus to effect an interruption of said first circuit as well as a substantially simultaneous interruption of said second circuit.

2. The circuit protection device as recited in claim 1 in which a second fuse conductor is utilized alongside the first mentioned fuse conductor, but electrically separate therefrom, with both of said fuse conductors being fractured with the fracturing of said substrate.

3. The circuit protection device as recited in claim 1 in which a plurality of electrically separate fuse conductors are utilized alongside the first mentioned fuse conductor, with all of said fuse conductors being fractured with the fracturing of said substrate.

4. The circuit protection device as recited in claim 1 in which a second fuse conductor is utilized on the opposite surface of said substrate from said first mentioned fuse conductor, but electrically separate therefrom, with both of said fuse conductors being fractured with the fracturing of said substrate.

5. The circuit protection device as recited in claim 1 in which a second resistive component is utilized, said second resistive component being placed on the opposite side of said substrate from the first mentioned resistive component.

6. The circuit protection device as recited in claim 5 in which said second resistive component is in an electrically parallel relationship with said first resistive component.

7. A circuit protection device designed to protect a pair of electrical circuits by fracturing at such time as an overcurrent condition has occurred in a first of said circuits, said device comprising a substantially flat substrate of non-conductive, frangible material upon which a resistive component and a fuse conductor reside in an adjacent relationship to each other, said substrate being mounted in a substantially orthogonal relationship to a circuit board, said resistive component being disposed at a location on said substrate comparatively close to said circuit board, with an edge of said resistive component residing essentially parallel to the surface of such circuit board, said resistive component being part of said first circuit and said fuse conductor being part of a second circuit, said resistive component, at the time of an overcurrent therethrough, becoming hot and causing a heating of the near surface of said frangible substrate, said frangible substrate, as a result of such heating, elongating and then fracturing, the fracturing of said frangible substrate thereby bringing about a fracturing of said resistive component as well as a fracturing of said fuse conductor, thus to effect an interruption of said first circuit as well as a substantially simultaneous interruption of said second circuit.

8. The circuit protection device as recited in claim 7 in which a second fuse conductor is utilized alongside the first mentioned fuse conductor, but electrically separate therefrom, with both of said fuse conductors being fractured with the fracturing of said substrate.

9. The circuit protection device as recited in claim 7 in which a plurality of electrically separate fuse conductors are utilized alongside the first mentioned fuse conductor, with all of said fuse conductors being fractured with the fracturing of said substrate.

10. The circuit protection device as recited in claim 7 in which a second fuse conductor is utilized on the opposite surface of said substrate from said first mentioned fuse conductor, but electrically separate therefrom, with both of said fuse conductors being fractured with the fracturing of said substrate.

11. The circuit protection device as recited in claim 7 in which a second resistive component is utilized, said second resistive component being placed on the opposite side of said substrate from the first mentioned resistive component.

12. The circuit protection device as recited in claim 11 in which said second resistive component is in an electrically parallel relationship with said first resistive component.

13. A circuit protection device designed to protect a pair of electrical circuits by fracturing at such time as an overcurrent condition has occurred in a first of said circuits, said device comprising a substantially flat substrate of non-conductive, frangible material upon which a resistive component and a fuse conductor reside in an adjacent relationship on a common surface, said substrate being operatively mounted in a substantially orthogonal relationship to a circuit board, with one edge of said substrate being comparatively close to such circuit board and another edge remote therefrom, said resistive component being disposed at a location on said substrate adjacent said one edge, and said fuse conductor being disposed essentially parallel to said resistive component but located closer to said other edge, said resistive component being part of said first circuit, and said fuse conductor being part of a second circuit, said resistive component, at the time of an overcurrent therethrough, becoming hot and causing a heating of the near surface of said frangible substrate, said frangible substrate, as a result of such heating, elongating and then fracturing, with the center of such fracturing occuring very close to the location of said fuse conductor, the fracturing of said frangible substrate thus bringing about a fracturing of said resistive component as well as a fracturing of said fuse conductor, effecting an interruption of said first circuit as well as a substantially simultaneous interruption of said second circuit.

14. The circuit protection device as recited in claim 13 in which a second fuse conductor is utilized alongside the first mentioned fuse conductor, but electrically separate therefrom, with both of said fuse conductors being fractured with the fracturing of said substrate.

15. The circuit protection device as recited in claim 13 in which a plurality of electrically separate fuse conductors are utilized alongside the first mentioned fuse conductor, with all of said fuse conductors being fractured with the fracturing of said substrate.

16. The circuit protection device as recited in claim 13 in which a second fuse conductor is utilized on the opposite surface of said substrate from said first mentioned fuse conductor, but electrically separate therefrom, with both of said fuse conductors being fractured with the fracturing of said substrate.

17. The circuit protection device as recited in claim 13 in which a second resistive component is utilized, said second resistive component being placed on the opposite side of said substrate as the first mentioned resistive component.

18. The circuit protection device as recited in claim 17 in which said second resistive component is in an electrically parallel relationship with said first resistive component.

19. A circuit protection device designed so as to project, by fracturing, a pair of electrical circuits, said device comprising a substantially flat substrate of non-conductive, frangible material having opposed parallel flat surfaces as well as first and second edges, said substrate being supported adjacent an associated electrical circuit board by means of a plurality of connection pins disposed in alignment along said first edge, with the second, opposite edge of said substrate remaining free, a resistive element tightly affixed on one flat surface of said substrate, extending widthwise across a substantial portion of said substrate and generally parallel to said first edge, said resistive element being electrically connected by one pair of said connection pins to a first associated electrical circuit, a fuse conductor also tightly affixed on said one flat surface, located generally adjacent said resistive element, but disposed nearer said second edge of said substrate, said fuse conductor being electrically connected to a second, associated electrical circuit by connection pins, said resistive element, when carrying an overcurrent, becoming heated and thus causing a heating of the near surface of said substrate, said near surface of said substrate then tending to elongate and to establish a considerable amount of mechanical stress in a central portion of said substrate, said first edge, being restrained by said aligned connection pins, remaining comparatively straight, whereas said second edge of said substrate, being unrestrained, tending to undertake a substantial curvature at the time a sizable overcurrent is flowing through said resistive element, contributing to the fracturing of said frangible substrate, of said resistive element, and of said fuse conductor, thus breaking and interrupting the electrical circuit of said fuse conductor, irrespective of the absence of an overcurrent flowing through said fuse conductor.

20. The circuit protection device as recited in claim 19 in which a second fuse conductor is utilized alongside the first mentioned fuse conductor, but electrically separate therefrom, with both of said fuse conductors being fractured with the fracturing of said substrate.

21. The circuit protection device as recited in claim 19 in which a plurality of electrically separate fuse conductors are utilized alongside the first mentioned fuse conductor, with all of said fuse conductors being fractured with the fracturing of said substrate.

22. The circuit protection device as recited in claim 19 in which a second fuse conductor is utilized on the opposite surface of said substrate from said first mentioned fuse conductor, but electrically separate therefrom, with both of said fuse conductors being fractured with the fracturing of said substrate.

23. The circuit protection device as recited in claim 19 in which a second resistive component is utilized, said second resistive component being placed on the opposite side of said substrate as the first mentioned resistive component.

24. The circuit protection device as recited in claim 23 in which said second resistive component is in an electrically parallel relationship with said first resistive component.

25. A circuit protection device designed so as to protect, by fracturing, more than a single electrical circuit, said device comprising a substantially flat substrate of non-conductive, frangible material of generally rectangular configuration, said substrate having opposed parallel flat surfaces, said flat surfaces terminating in one direction in first and second relatively straight, opposed edges, with said substrate being supported adjacent an associated electrical circuit by means of a plurality of connection pins disposed in alignment along said first edge, with the second, opposite edge remaining free, a resistive element tightly affixed on one flat surface of said substrate, extending widthwise across a substantial portion of said substrate and generally parallel to said first edge, along which said connection pins are located, said resistive element being electrically connected by a pair of said connection pins to a first portion of said associated electrical circuit, a fuse conductor also tightly affixed on said one flat surface of said substrate, located generally adjacent said resistive element, but disposed nearer said second edge, said fuse conductor being electrically connected to a second portion of the associated electrical circuit by a pair of said connection pins, said resistive element, when carrying an overcurrent, becoming heated and causing the near surface of said substrate to become heated and expand to a greater extent than the opposite side of said substrate, leading to the buildup of a considerable amount of stress in said substrate, said first edge, being restrained by said aligned connection pins, remaining comparatively straight, whereas said second edge, being unrestrained, tending to undertake a substantial curvature at the time a sizable overcurrent is flowing through said resistive element, contributing to the fracturing of said frangible substrate, of said resistive element, and of said fuse conductor, thus breaking and interrupting the electrical circuit of said fuse conductor, irrespective of the absence of an overcurrent flowing through said fuse conductor.

26. The circuit protection device designed to protect a pair of electrical circuits by fracturing as recited in claim 25 in which a pair of resistive components are utilized in electrically parallel relation on opposed parallel flat surfaces of said frangible substrate, said resistive components being of different ohmage, so as to assure the fracturing of said substrate at the time of a substantial overcurrent through said first circuit.

27. The circuit protection device designed to protect a pair of electrical circuits by fracturing as recited in claim 25 in which more than one fuse conductor is utilized on said substrate, with each such fuse conductor being associated with a separate electrical circuit, and with each of said fuse conductors being fractured at the time of a substantial overcurrent through said resistive component.

28. A telecommunications system comprising:
a subscriber line comprising tip and ring conductors;
a subscriber line interface circuit to which said subscriber line is connected for coupling the subscriber line to the remainder of the telecommunications system;
surge voltage protective means coupled between the tip and ring conductors and earth;
first and second current limiting resistances having nominally equal values inserted in the tip and ring conductors respectively;
first and second feedback lines coupled between the tip and ring conductors respectively and the subscriber line interface circuit whereby to equalize the impedances of the first and second resistances in the subscriber line;
a first electrical component comprised of said first resistance and a part of the associated feedback line, a second electrical component comprised of said second resistance and a part of the associated feedback line, wherein each of said first and second electrical components comprises;
a frangible substrate, a resistance material formed on a surface of said substrate, a conductive strip of fusible material formed at a location adjacent said resistance on a surface of said substrate, whereby when in a surge condition the power rating of the component is exceeded and the temperature of the resistance material rises, a bending of the substrate is caused through a temperature differential whereby fracturing occurs of said substrate, said resistance material and said conductive strip, whereby to cause electrical and physical isolation of the subscriber line interface circuit from the subscriber line.

29. A system as claimed in claim 28, wherein each said electrical component comprises said resistance material formed on a lower part of said substrate, said conductive strip being formed on an upper part of the substrate and the electrical component including first electrical terminal means carried at a lower edge of said substrate and electrically connected to said resistance material and second electrical terminal means carried at a lower edge of the substrate and electrically connected to said conductive strip.

30. A system as claimed in claim 29 wherein each of said first and second electrical terminal means comprises a pair of terminal pins depending from the lower edge of the substrate.

31. An electrical component for protection of a subscriber line interface circuit,
the electrical component comprising a substrate, a resistance material having a predetermined power rating disposed on a lower part of one face of the substrate and a conductive strip disposed on an upper part of the substrate;
first electrical terminal means carried at a lower edge of said substrate and electrically connected to said resistance material for electrical connection to a conductor of a subscriber line;
second electrical means carried at a lower edge of said substrate and electrically connected to said conductive strip for electrical connection to a feedback line of a subscriber line interface circuit;
wherein the substrate, resistance material and conductive strip are so disposed and arranged that upon fixing of said electrical terminal means in an external circuit and upon current flow through the resistance material exceeding the power rating thereof, the substrate bends in a first direction across a dimension of the resistance material and in a second dimension from the lower to the upper part of the substrate whereby to create a concentration of stress in the upper part of the substrate so that firstly the conductive strip and then the resistance material are physically fractured.

32. An electrical component according to claim 31, wherein the substrate comprises a rectangular sheet member, the resistance material comprises a film deposition, rectangular in form disposed on a lower part of the substrate, the first electrical terminal means comprises first and second conductive tracks extending from the respective first and second pins along opposite side edges of the film deposition and electrically connected therewith, and the second electrical terminal means comprising said first terminal pin and a third terminal pin, said first conductive tracks-extending to one end of said conductive strip, and a third conductive track extending from the other end of said conductive strip to said third terminal pin.

33. An electrical component as claimed in claim 32, wherein said film deposition is a thick film deposition.

* * * * *